US009174735B2

(12) United States Patent
Klepka (10) Patent No.: US 9,174,735 B2
(45) Date of Patent: Nov. 3, 2015

(54) SEALING DEVICE FOR GALLEY HARD POINT (71) Applicant: Airbus Operations GmbH, Hamburg (DE)

(72) Inventor: Frank Klepka, Berlin (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 205 days.

(21) Appl. No.: 13/927,415

(22) Filed: Jun. 26, 2013

(65) Prior Publication Data

US 2014/0021297 A1 Jan. 23, 2014

Related U.S. Application Data (60) Provisional application No. 61/674,419, filed on Jul. 23, 2012.

(30) Foreign Application Priority Data

Jul. 23, 2012 (EP) .................................... 12177515

(51) Int. Cl.
B64D 11/00 (2006.01)
B64D 13/00 (2006.01)
B64D 11/04 (2006.01)
F16B 33/00 (2006.01)
F16B 35/06 (2006.01)

(52) U.S. Cl.
CPC ................ B64D 11/04 (2013.01); B64D 11/00 (2013.01); F16B 33/004 (2013.01); F16B 35/06 (2013.01)

(58) Field of Classification Search
CPC ........ B64D 11/04; B64D 11/00; B64D 9/003; B64C 1/20; F16B 35/06; F16B 33/004
See application file for complete search history.

(56) References Cited

U.S. PATENT DOCUMENTS

| 2,940,784 | A | * | 6/1960 | Fell .............................. 74/89.35 |
| 4,043,239 | A | | 8/1977 | DeFusco |
| 4,186,645 | A | | 2/1980 | Zaydel |
| 4,456,206 | A | | 6/1984 | Tijssen |
| 5,816,758 | A | * | 10/1998 | Huber ............................ 410/77 |
| 6,024,330 | A | * | 2/2000 | Mroz et al. ................ 248/188.4 |
| 6,042,315 | A | * | 3/2000 | Miller et al. ................. 411/411 |
| 6,361,096 | B2 | * | 3/2002 | Kim ............................ 296/35.1 |
| 7,374,131 | B2 | | 5/2008 | Tiid et al. |

(Continued)

FOREIGN PATENT DOCUMENTS

EP 1596075 A1 11/2005

OTHER PUBLICATIONS

European Searching Authority, European Search Report for Application No. 12177515.9 Mailed Dec. 19, 2012.

Primary Examiner — Philip J Bonzell
(74) Attorney, Agent, or Firm — Ingrassia, Fisher & Lorenz, P.C.

(57) ABSTRACT

A sealing device for mounting a monument on a structural element of an aircraft and for providing a seal between the sealing device and the floor of the aircraft is provided. The sealing device comprises a cylindrical element with a pin for attaching the sealing device to the structural element and a recess for receiving another pin of a mounting device to which the monument is attached. The sealing device may have a smaller diameter than a mounting block of the mounting device such that the seal cannot be damaged by trolley wheels.

17 Claims, 4 Drawing Sheets

(56) References Cited

U.S. PATENT DOCUMENTS

| | | | |
|---|---|---|---|
| 7,748,661 B2* | 7/2010 | Harris et al. | 244/131 |
| 7,784,734 B2* | 8/2010 | Christman | 244/102 R |
| 7,922,433 B2 | 4/2011 | Ricciardo | |
| 8,444,359 B2 | 5/2013 | Grether et al. | |
| 2004/0037667 A1 | 2/2004 | Stephen | |

* cited by examiner

SEALING DEVICE FOR GALLEY HARD POINT

CROSS-REFERENCE TO RELATED APPLICATIONS

This application claims priority to European Patent Application No. 12 177 515.9, filed Jul. 23, 2012 and to U.S. Provisional Patent Application No. 61/674,419, filed Jul. 23, 2012, which are each incorporated herein by reference in their entirety.

TECHNICAL FIELD

The technical field pertains to the field of mounting devices for fastening monuments in a means of transport. The technical field particularly relates to a sealing device for mounting a monument on a structural element of an aircraft, a monument of an aircraft cabin comprising a plurality of sealing devices, and to a means of transport.

BACKGROUND

Monuments, such as galleys, toilet modules, separation walls or stair houses, may be mounted on a structural element of a means of transport by using mounting devices to which the monument is connected and which are, in turn, mounted on the structural elements. Such mounting devices may comprise a pin protruding downwards, which can be screwed into a corresponding hole in the structural element.

DE 10 2004 012 262 A1 and WO 2005/095209 A1 describes a mounting device for cabin elements in an airplane. The device comprises a threaded bushing which can be screwed into a fastening element in order to adjust the distance between monument and floor. For sealing purposes, a sealing ring is arranged in a recess of a floor plate on which the device is installed.

DE 31 22 366 A1 describes a connection device for mounting of monuments to structural elements of an aircraft. A sealing ring is arranged between the floor plate and a bushing of the connection device. The bushing is attached to the structural element by means of a screw which runs through the bushing.

Other objects, desirable features and characteristics will become apparent from the subsequent summary and detailed description, and the appended claims, taken in conjunction with the accompanying drawings and this background.

SUMMARY

According to various embodiments, the present disclosure provides for a mounting of a monument on a structural element of a means of transport which is easy to install and provides a reliable sealing.

According to one of various aspects of the present disclosure, a sealing device for mounting a monument on a structural element of an aircraft and for providing a seal between the sealing device and a floor of the aircraft is provided. The sealing device comprises a cylindrical element with a top region and a bottom region. The bottom region comprises a first pin for attaching the sealing device to the structural element of the aircraft and the top region comprises a recess for receiving a second pin of a mounting device of the monument for attaching the monument to the sealing device.

In other words, the sealing device is mounted on the structural element and the mounting device of the monument is mounted on the sealing device.

The cylindrical element of the sealing device may be made of stainless steel, aluminium or another metal or metal compound.

It should be noted that the pin of the bottom region of the sealing device, which is inserted into a hole in the structural element, may have the same diameter as the pin of the mounting device, which is inserted into a hole in the cylindrical element of the sealing device.

Thus, the sealing device may be mounted on a structural element of the aircraft which, alternatively, may be used for mounting the mounting device of the monument. Therefore, the sealing device can be used for retrofitting purposes without changing the structural elements, the monuments or the mounting devices of the monuments.

According to one exemplary embodiment of the present disclosure, the first pin comprises an external thread for screwing the cylindrical element in the structural element of the aircraft.

Thus, the cylindrical element may be screwed into the structural element and then, the mounting device may be screwed into the cylindrical element, or vice versa.

According to another exemplary embodiment of the present disclosure, the recess in the top region of the cylindrical element comprises an internal thread for screwing the second pin of the mounting device of the monument in the cylindrical element. For doing so, the pin of the mounting device comprises an external thread.

As already mentioned above, the pin of the mounting device and the pin of the cylindrical element may have the same diameter. Both pins may comprise a thread, wherein the lead of the two threads may be identical such that the pins can be screwed into the same threaded recesses.

According to another exemplary embodiment of the present disclosure, the sealing device further comprises a first sealing jacket which surrounds the cylindrical element. Floor elements are positioned above the structural element of the aircraft. The first sealing jacket comprises a deformable material which provides a seal between the sealing device and the floor of the aircraft when the sealing device is attached to the structural element below the floor and when the first sealing jacket is pressed against the floor.

In other words, the sealing device is comprised of at least two parts, one part being the cylindrical element with its pin, used for firmly attaching the sealing device to the structural element of the aircraft. The second element is the first sealing jacket which surrounds the cylindrical element and which provides the seal between the sealing device and the floor.

Thus, sealing function and attachment function are provided by different elements. For this reason, the attachment of the cylindrical element to the structural element of the means of transport can be done before the sealing jacket is moved towards the floor to provide the seal.

According to one exemplary embodiment of the present disclosure, at least a first part of a peripheral surface of the cylindrical element comprises an external thread, wherein the first sealing jacket comprises an internal thread for screwing the first sealing jacket on the cylindrical element.

In other words, the first sealing jacket can be screwed onto the cylindrical element and, after the cylindrical element is firmly mounted on the structural element, the sealing jacket can be screwed towards the floor such that it is pressed against the floor.

According to another exemplary embodiment of the present disclosure, the first sealing jacket comprises a sealing region at its lower end which has a concave shape, wherein the sealing region is made of the deformable material. The concave shape may provide for an improved sealing effect.

According to one exemplary embodiment of the present disclosure, the sealing device further comprises a sealing bushing surrounding the cylindrical element. At least a second part of the peripheral surface of the cylindrical element is smooth and the sealing bushing is adapted for sliding over the peripheral surface of the cylindrical element and for providing a seal between the sealing device and the floor of the aircraft when the sealing device is attached to the structural element of the aircraft and when the sealing bushing is pressed against the floor.

The cylindrical element of the sealing device may be firmly attached to the structural element, for example by screwing it on the structural element. Then, the sealing bushing may be put over the cylindrical element and pushed downwards towards the floor until it abuts the floor in order to provide a seal.

In order to enhance the sealing effect, the sealing bushing may comprise a ring-like recess on its lower end which is pressed against the floor. A sealing ring (O-ring) is positioned in the ring-like recess and is pressed against the floor when the sealing bushing is pressed against the floor, in order to provide the seal.

According to another exemplary embodiment of the present disclosure, the sealing device comprises a second jacket. The sealing bushing comprises an external thread and the second jacket comprises a corresponding internal thread for screwing the second jacket on the sealing bushing.

According to one exemplary embodiment of the present disclosure, the second jacket comprises an end plate with a recess, wherein the end plate abuts and presses against the mounting device which is screwed into the sealing device.

Therefore, the sealing bushing is pressed against the floor when the sealing device is mounted on the structural element of the aircraft and when the second jacket is turned with respect to the sealing bushing in the "unscrew" direction, such that it moves upwards and presses against a surface of the mounting device.

The recess of the end plate is adapted for receiving the second pin of the mounting device of the monument.

According to another exemplary embodiment of the present disclosure, the sealing bushing comprises a lower region with a sealing ring for providing the seal.

According to one of various aspects of the present disclosure, a monument of an aircraft cabin is provided, which comprises a plurality of the sealing devices described above and below.

According to another exemplary embodiment of the present disclosure, the monument is adapted as a galley, a toilet module, a separation wall, a staircase or a crew rest compartment.

According to one of various aspects of the present disclosure, a means of transport is provided which comprises a floor, a monument and a plurality of the above and below described sealing devices.

According to another exemplary embodiment of the present disclosure, the means of transport is an aircraft, such as an airship, a helicopter, a passenger airplane or a spaceship, a land vehicle, such as a train, a bus or a lorry, or a ship.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
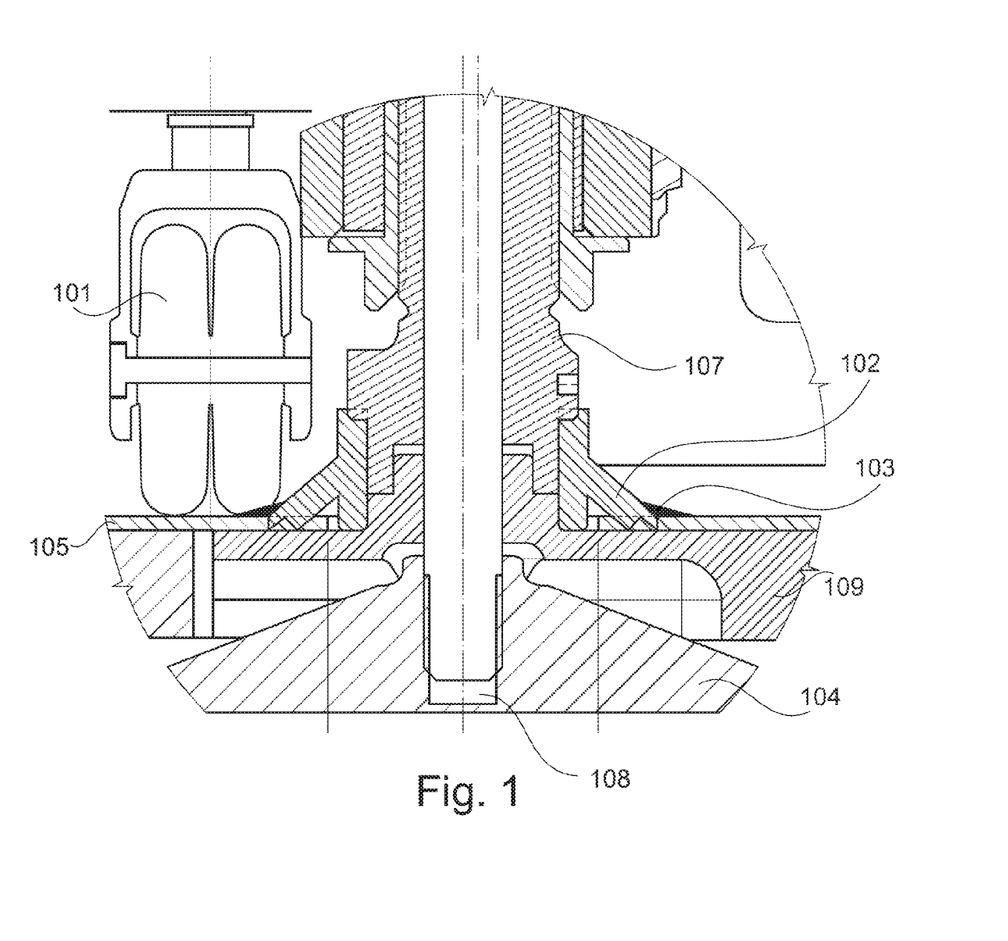
FIG. 1 shows a cross-sectional view of a mounting device mounting a monument to a structural element of an aircraft.

FIG. 1 shows a cross-sectional view of a mounting device mounting a monument on a structural element 104 of an aircraft or other means of transportation. The mounting device comprises a bushing 107 through which a screw 106 runs which is screwed into a corresponding recess 108 of the structural element 104.

The bushing 107 presses against a floor element 109 of the floor of the aircraft. The floor element 109 is covered with floor plates 105.

In order to provide a sealing between the mounting device and the floor, a sealing element 102 and a silicone seal 103 surround the bushing 107. The sealing element 102 is pressed onto the floor plates 105 when the screw 106 is screwed into the recess 108 of the structural element 104, thereby pushing the bushing 107 down towards the floor.

However, the sealing element 102 and the silicone seal 103 may be damaged during installation or during use of the monument, for example, by trolley wheels 101 or other movable equipment.

Furthermore, turning of the bushing 107 may also lead to a rotation of the sealing element 102 which may lead to a damage of the seal.

Figure 2:
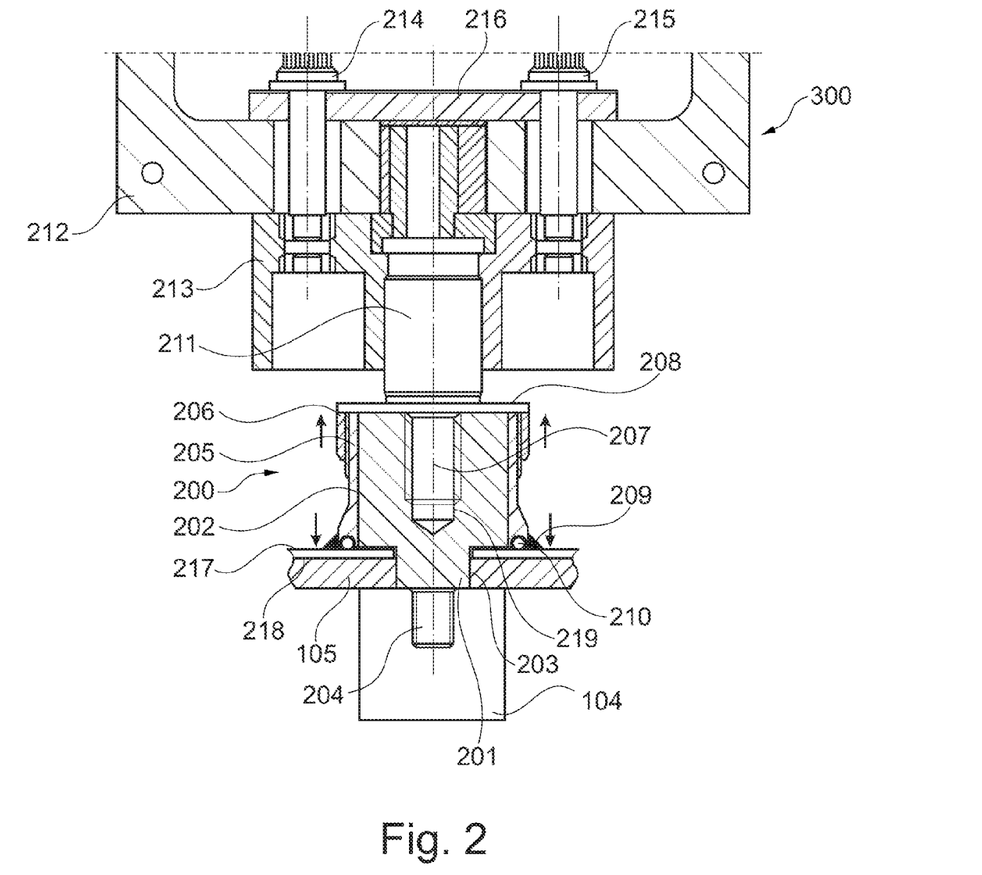
FIG. 2 shows a sealing device according to an exemplary embodiment of the present disclosure.

FIG. 2 shows a cross-sectional view of a sealing device 200, which is arranged between a structural element 104 of a means of transport and a mounting device 211, 207 for mounting a monument 300 on the sealing device 200.

The sealing device 200 comprises a rotationally symmetrical element 201 in form of a cylinder which comprises one or more steps in its lower region.

The cylindrical element may be composed of a metal, for example aluminum.

The lower region of the cylindrical element may comprise two steps, such that the cylindrical element 201 comprises three cylindrical sections with different diameters.

The upper section has the largest diameter and abuts the surface of the top layer of the floor 217 of the means of transport. Between the top layer 217 of the floor and the floor panel 105, a sealing layer 218 in form of a sealing foil, such as a PET-foil, may be provided.

The middle section of the cylindrical element 201 is arranged in a cylindrical recess 203 of the floor and has the same thickness as the floor 105, 218, 217.

The lower section 204 of the cylindrical element is adapted in form of a pin with an external thread. This pin 204 can be screwed into a corresponding recess in the structural element 104, which comprises a corresponding internal thread.

The upper section of the cylindrical element 201 comprises a recess 219 with an internal thread, into which the pin 207 of the mounting device 207, 211 is screwed.

The mounting device 207, 211 is firmly attached to a lower part 212 of the monument 300 via screws 214, 215, mounting block 213, arranged on one side of the lower part 212 of the monument, and back plate 216, which is arranged on the other side of the lower part 21.

Furthermore, a sealing bushing 205 is slipped over the cylindrical body 201 of the sealing device. The surface 202 of the upper section of the cylindrical body 201 is smooth in order to allow for the bushing 205 to slide in the direction of the arrows upwards or downwards, i.e., in the direction of the rotational axis of the cylindrical body.

The sealing bushing 205 comprises an external thread in its upper section onto which a jacket 206 is screwed. The jacket 206 comprises an upper end plate 208 with a recess in its middle for receiving the pin 207 of the mounting device 207, 211.

When the jacket 206 is turned such that it rotates with respect to the sealing bushing 205 and the cylindrical element 201 and moves upwards, i.e., away from the floor 105, 218, 217 and towards the upper section 211 of the mounting device, the end plate 208 abuts and presses against the upper section of the mounting device 211. As a consequence, the sealing bushing 205 is pressed in opposite direction and onto the floor.

The sealing bushing 205 comprises a ring-like recess in its lower end which receives a sealing ring 210, which is pressed onto the upper surface of the floor.

One advantage of this arrangement is that the sealing ring 210 is not rotated when pressed onto the floor. Thus, mechanical stress on the sealing ring 210 may be reduced.

The sealing may further be improved by an additional, ring-like sealing 209, for example in form of a silicon seal.

Figure 3:
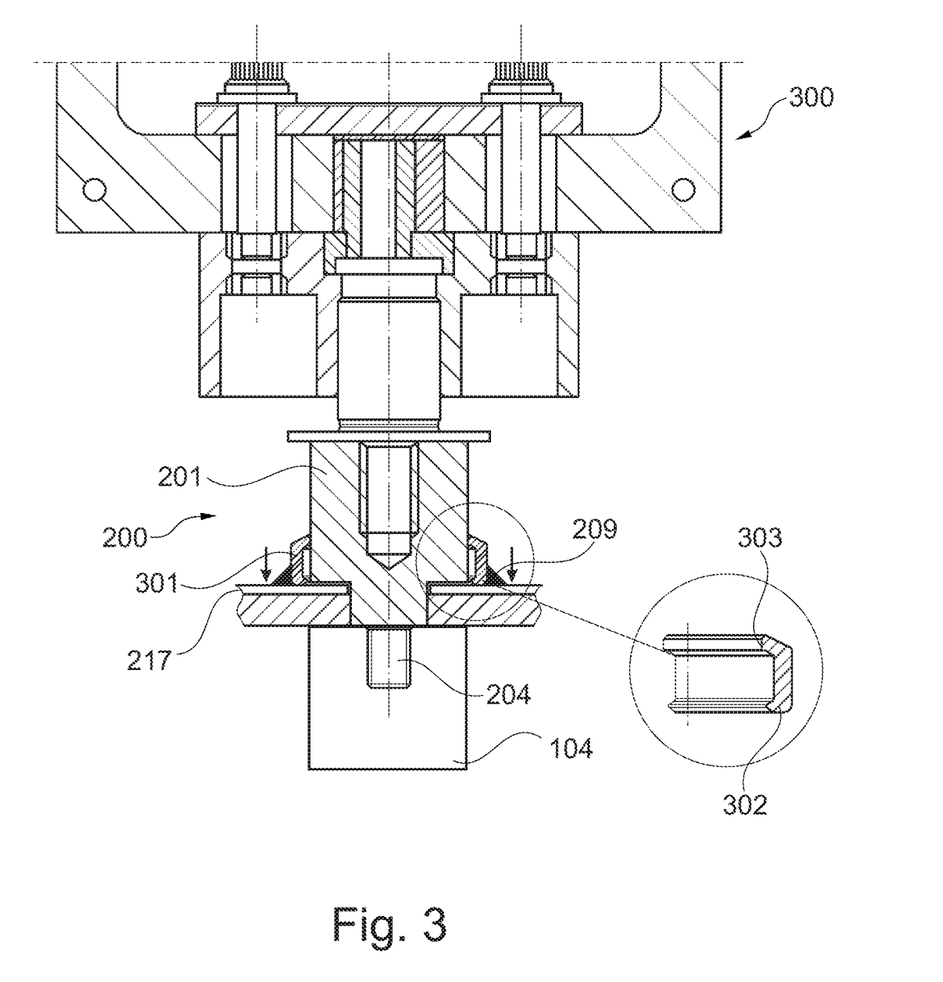
FIG. 3 shows a sealing device according to another exemplary embodiment of the present disclosure.
Figure 4:
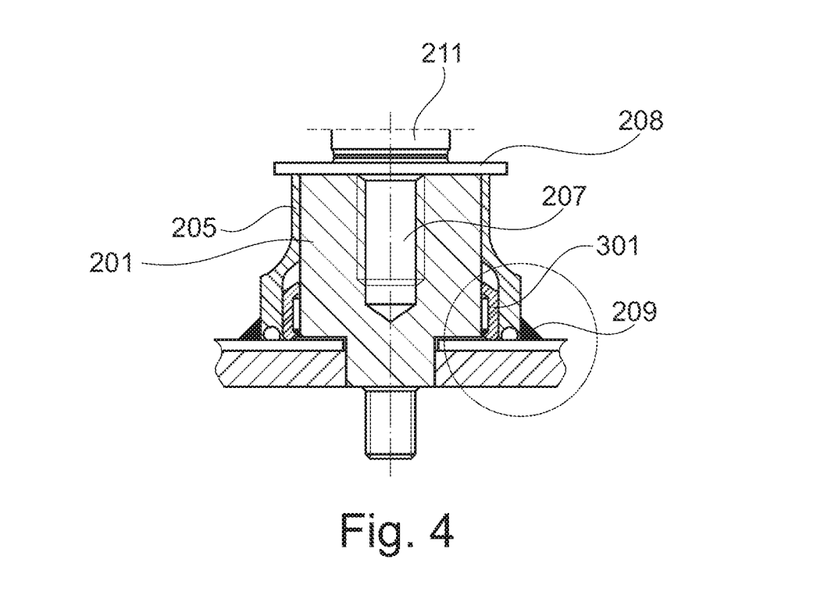
FIG. 4 shows a sealing device according to another exemplary embodiment of the present disclosure.

The sealing devices depicted in FIGS. 2 to 4 may be used for retrofitting cabin installations, since they can simply be installed between already existent mounting devices with mounting pins 207 and a structural element 104.

Since the sealing device has a smaller diameter than existing mounting devices, the outer seal 209 may be protected from trolley wheels.

It should be noted that the sealing bushing 205 may be made of plastic and the jacket 206 may also be made of plastic.

FIG. 3 shows a cross-sectional view of a sealing device 200 arranged between a monument with its mounting device and a floor which is arranged on top of a structural element 104.

At least the lower part of the peripheral surface of the cylindrical element 201 comprises an external thread, onto which a sealing jacket 301 is screwed. The sealing jacket 301 may be made of or at least comprises plastic or some other deformable material. The lower portion 302 of sealing jacket 301 has a concave shape. The upper portion 303 of the sealing jacket 301 comprises an internal thread for screwing the sealing jacket onto the cylindrical element 301.

No O-ring needs to be provided. The sealing effect is achieved by rotating the sealing jacket 301 with respect to the cylindrical element 201 such that it moves downwards, i.e., towards the upper surface of the floor 217. As an additional measure, a silicon seal 209 may be provided between the outer surface of the sealing jacket and the upper surface of the floor 217.

It is also possible to provide both the sealing jacket 301 and the sealing bushing 205. This is depicted in FIG. 4. However, in this exemplary embodiment, no second jacket 206 is depicted, although it may also be provided for pushing the sealing bushing 205 towards the floor.

In this particular embodiment, the sealing bushing 205 is pushed against the floor when the pin 207 of the mounting device is screwed into the cylindrical body 201, thereby causing the upper part 211 of the mounting device to push against the plate 208, which, in turn, pushes the sealing bushing 205 towards the floor.

It should be noted that a monument of an aircraft cabin, such as a galley, may comprise four or more sealing devices 200 and mounting devices 211, 207.

Figure 5:
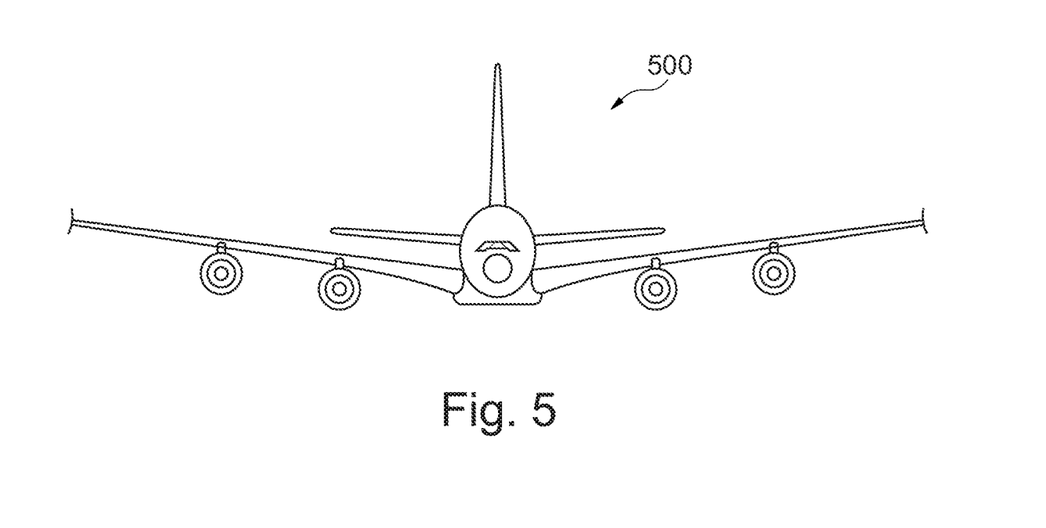
FIG. 5 shows an aircraft according to an exemplary embodiment of the present disclosure.

FIG. 5 shows a means of transport in form of a passenger airplane. The airplane comprises a floor, a monument and a plurality of sealing devices, such as the ones described above. The sealing devices are used for mounting the monument on a structural element of the airplane and for providing a seal between the sealing device and the floor of the airplane.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A sealing device for mounting a monument on a structural element of an aircraft and for providing a seal between the sealing device and a floor of the aircraft, the sealing device comprising:
    a cylindrical element with a top region and a bottom region, the bottom region including a first pin for attaching the sealing device to the structural element of the aircraft, and the top region defining a recess for receiving a second pin of a mounting device of the monument for attaching the monument to the sealing device;
    a sealing bushing surrounding the cylindrical element; and
    a jacket,
    wherein at least a first part of a peripheral surface of the cylindrical element is smooth, and the sealing bushing is slidable over the peripheral surface of the cylindrical element to provide a seal between the sealing device and the floor of the aircraft when the sealing device is attached to the structural element of the aircraft and the sealing bushing is pressed against the floor,
    wherein the sealing bushing comprises an external thread and the jacket comprises an external thread for screwing the jacket on the sealing bushing, and
    wherein the jacket comprises an end plate with a recess and the end plate presses against the mounting device of the monument when the jacket is turned with respect to the sealing bushing, thus pressing the sealing bushing against the floor when the sealing device is mounted on the structural element of the aircraft, and the recess is adapted for receiving the second pin of the mounting device of the monument.

2. The sealing device of claim 1, wherein the first pin comprises an external thread for screwing the cylindrical element in the structural element of the aircraft.

3. The sealing device of claim 1, wherein the recess in the top region of the cylindrical element comprises an internal thread for screwing the second pin of the mounting device of the monument, which comprises an external thread, in the cylindrical element.

4. The sealing device of claim 1, wherein the sealing bushing comprises a lower region with a sealing ring for providing the seal.

5. A sealing device for mounting a monument on a structural element of an aircraft and for providing a seal between the sealing device and a floor of the aircraft, the sealing device comprising:
   a cylindrical element with a top region and a bottom region, the bottom region including a first pin for attaching the sealing device to the structural element of the aircraft, and the top region defining a recess for receiving a second pin of a mounting device of the monument for attaching the monument to the sealing device; and
   a first sealing jacket surrounding the cylindrical element;
   wherein the structural element of the aircraft is positioned below the floor of the aircraft, and the first sealing jacket comprises a deformable material which provides a seal between the sealing device and the floor of the aircraft when the sealing device is attached to the structural element of the aircraft and the first sealing jacket is pressed against the floor.

6. The sealing device of claim 5, wherein at least a first part of a peripheral surface of the cylindrical element comprises an external thread, and the first sealing jacket comprises an internal thread for screwing the first sealing jacket on the cylindrical element.

7. The sealing device of claim 5, wherein the first sealing jacket comprises a sealing region at its lower end which has a concave shape, and the sealing region is made of the deformable material.

8. An aircraft having a passenger cabin and including a monument, comprising:
   a plurality of sealing devices each including a cylindrical element with a top region and a bottom region, the bottom region including a first pin for attaching the sealing device to a structural element in the aircraft, and the top region defining a recess for receiving a second pin of a mounting device of the monument for attaching the monument to the sealing device,
   wherein the first pin comprises an external thread for screwing the cylindrical element in the structural element of the aircraft;
   a sealing bushing surrounding the cylindrical element; and
   a jacket,
   wherein at least a first part of a peripheral surface of the cylindrical element is smooth, and the sealing bushing is slidable over the peripheral surface of the cylindrical element to provide a seal between the sealing device and the floor of the aircraft when the sealing device is attached to the structural element of the aircraft and the sealing bushing is pressed against the floor,
   wherein the sealing bushing comprises an external thread and the jacket comprises an external thread for screwing the jacket on the sealing bushing, and
   wherein the jacket comprises an end plate with a recess and the end plate presses against the mounting device of the monument when the jacket is turned with respect to the sealing bushing, thus pressing the sealing bushing against the floor when the sealing device is mounted on the structural element of the aircraft, and the recess is adapted for receiving the second pin of the mounting device of the monument.

9. The monument of claim 8, wherein the monument is a galley.

10. The monument of claim 8, wherein each of the plurality of sealing devices further comprises:
    a first sealing jacket surrounding the cylindrical element;
    wherein the structural element of the aircraft is positioned below the floor of the aircraft, and the first sealing jacket comprises a deformable material which provides a seal between the sealing device and the floor of the aircraft when the sealing device is attached to the structural element of the aircraft and the first sealing jacket is pressed against the floor.

11. The monument of claim 10, wherein at least a first part of a peripheral surface of the cylindrical element comprises an external thread, and the first sealing jacket comprises an internal thread for screwing the first sealing jacket on the cylindrical element.

12. The monument of claim 10, wherein the first sealing jacket comprises a sealing region at its lower end which has a concave shape, and the sealing region is made of the deformable material.

13. A transportation device, comprising:
    a floor;
    a monument;
    a structural element;
    a plurality of sealing devices that couples the monument to the structural element of the transportation device and provides a seal between the sealing device and the floor of the transportation device, each of the plurality of sealing devices including a cylindrical element with a top region and a bottom region, the bottom region including a first pin for attaching the sealing device to the structural element in the transportation device, and the top region defining a recess for receiving a second pin of a mounting device of the monument for attaching the monument to the sealing device,
    wherein the recess in the top region of the cylindrical element comprises an internal thread for screwing the second pin of the mounting device of the monument, which comprises an external thread, in the cylindrical element;
    a sealing bushing surrounding the cylindrical element; and
    a jacket,
    wherein at least a first part of a peripheral surface of the cylindrical element is smooth, and the sealing bushing is slidable over the peripheral surface of the cylindrical element to provide a seal between the sealing device and the floor of the aircraft when the sealing device is attached to the structural element of the aircraft and the sealing bushing is pressed against the floor,
    wherein the sealing bushing comprises an external thread and the jacket comprises an external thread for screwing the jacket on the sealing bushing, and
    wherein the jacket comprises an end plate with a recess and the end plate presses against the mounting device of the monument when the jacket is turned with respect to the sealing bushing, thus pressing the sealing bushing against the floor when the sealing device is mounted on the structural element of the aircraft, and the recess is adapted for receiving the second pin of the mounting device of the monument.

14. The transportation device of claim 13, wherein the transportation device is an aircraft.

15. The transportation device of claim 13, wherein the monument is a galley.

16. The transportation device of claim 13, wherein each of the plurality of sealing devices further comprises:
a sealing bushing surrounding the cylindrical element,
wherein at least a second part of the peripheral surface of the cylindrical element is smooth, and the sealing bushing is slidable over the peripheral surface of the cylindrical element to provide a seal between the sealing device and the floor of the aircraft when the sealing device is attached to the structural element of the aircraft and the sealing bushing is pressed against the floor.

17. The transportation device of claim 16, wherein each of the plurality of sealing devices further comprises:
a second jacket,
wherein the sealing bushing comprises an external thread and the second jacket comprises an internal thread for screwing the second jacket on the sealing bushing.

\* \* \* \* \*